3,175,001
NITROARYLAMIDO-PHOSPHORIC ACID ESTERS
AND A PROCESS FOR THEIR PRODUCTION
Hans Holtschmidt, Cologne-Stammheim, Germany, assignor to Farbenfabriken Bayer Aktiengesellschaft, Leverkusen, Germany, a corporation of Germany
No Drawing. Filed June 24, 1959, Ser. No. 822,423
Claims priority, application Germany, July 19, 1958,
F 26,212
3 Claims. (Cl. 260—543)

The present invention relates to and has as its objects new and useful compounds which may be represented by the following general formula

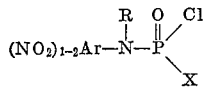

wherein R stands for aryl) including another $Ar(NO_2)_{1-2}$-group) or alkyl and X may be a further halogen atom, an ester group or a secondary or tertiary amino group (also containing again a further $Ar(NO_2)_{1-2}$-group).

It has been found that these secondary arylamido-phosphoric acid chlorides can readily be obtained in a practically quantitative yield by nitration of the corresponding nitro-group-free compounds. During the inventive reaction no saponification of the halogen atoms takes place. The inventive reaction is carried out by dissolving the starting compounds in highly concentrated nitric acid at a low temperature and subsequently precipitating the solution with water. It is surprising that sometimes if it is possible because of free hydrogens) during nitration two nitro groups are introduced into the aryl radical, since this is generally only possible at elevated temperatures or with sulfuric-nitric acid. It should also be expected that saponification of the chlorine atoms would occur during the subsequent working up procedure (i.e. by precipitation of the nitric acid solution with water) since the chlorine atoms are of acid chloride type.

Attempts have already been made to obtain primary nitroarylamido phosphoric acid chlorides by another method. Thus, for instance, Michaelis (Ann. 326, page 129) prepared the dichloride of the following formula

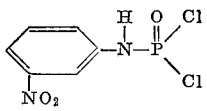

by reaction of m-nitraniline hydrochloride with $PCl_3$. The compound obtained is described as being highly unstable. The corresponding p-nitro-product was obtained in the same manner and is somewhat more stable. The yields are said to be very poor. The inventive compounds obtained from N-alkyl- or N-aryl-anilines, just as the corresponding dinitro compounds, are unknown as yet.

Examples of types of compounds (or compounds having a similar structure) which are suitable for the production of the compound according to the invention are as follows:

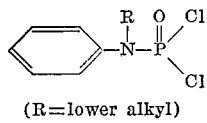
(R=lower alkyl)

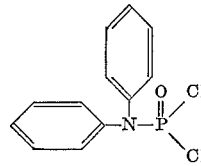
(R=lower alkyl)

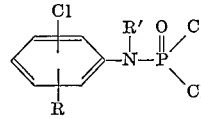
(R and R'=lower alkyl)

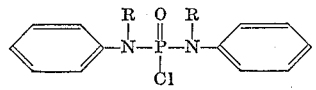
(R=lower alkyl)

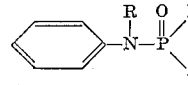
(R and R'=lower alkyl)

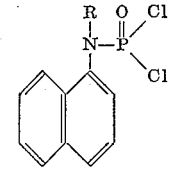
(R=lower alkyl)

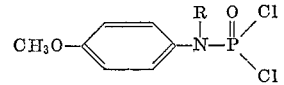
(R=lower alkyl)

The nitration is carried out in such a manner that the arylamido-phosphoric acid chlorides are introduced into concentrated nitric acid (90–100%) cooled to —5 to —10° C. with the proviso that in the highly exothermic reaction the temperature does not rise above +20° C. When the reaction is completed, the mixture is diluted with ice water while stirring whereby the desired nitro compounds are obtained in general in a crystalline and analytically pure form in 90–100% yield. They are washed acid-free with cold water and air-dried.

By this new and surprising way there may not only be obtained the novel compounds of this invention, but also in very good yields the known primary arylamido phosphoric acid chlorides of the type known already from Michaelis cited above.

The compounds according to the present invention are valuable intermediates, for example, for the production of plant protectants and plastics.

Thus, if the nitro-groups of the inventively obtained compounds are reduced to amino groups and these amines further are reacted by known methods to isocyanates and the chlorine atoms then or before these reactions are replaced by ester or amino groups, there are obtained valuable intermediates for polyisocyanate or polyurethane type resins.

If on the other hand the 1 or 2 free halogens in the inventively obtained nitro compounds are replaced by ester or amino groups there are obtained compounds with insecticidal or generally pesticidal activities.

The following example is given for the purpose of illustrating the invention:

*Example*

448 parts by weight (2 mol) of N-methyl-anilido-phosphoric acid dichloride

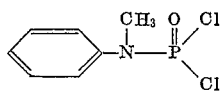

are introduced dropwise into 98% of nitric acid at —5–0° C. The mixture is subsequently diluted with ice and ice water whereby the 2.4-dinitro-N-methyl-anilido-phosphoric acid dichloride

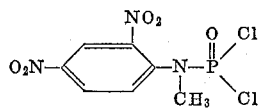

precipitates in the form of small yellow plates in 98% yield and nearly analytically pure. It is washed acid-free with water, dried and recrystallized from toluene. M.P. 106–108° C.

By the same way but using as a starting material N-ethyl-anilido-phosphoric acid dichloride there is obtained the following compound:

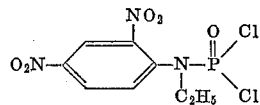

By the same way but using as a starting material N-propyl-anilido-phosphoric acid dichloride there is obtained the following compound:

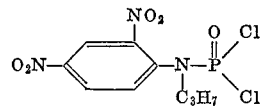

By the same way but using as a starting material di-(N-methyl-anilido)-phosphoric acid monochloride there is obtained the following compound:

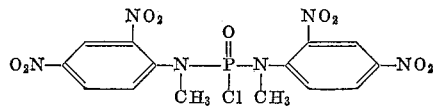

By the same way but using as a starting material di-phenyl-amido-phosphoric acid dichloride there is obtained the following compound:

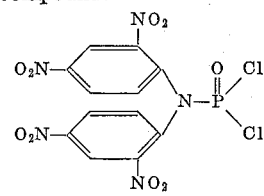

By the same way but using as a starting material N-methyl-(2.6-dichloro-anilido)-phosphoric acid dichloride there is obtained the following compound:

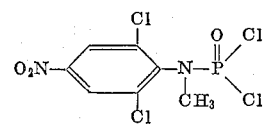

By the same way but using as a starting material N-methyl-(2.6-dimethyl-anilido)-phosphoric acid dichloride there is obtained the following compound:

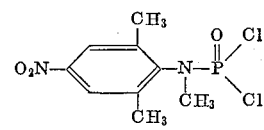

I claim:
1. The nitroarylamido-phosphoric acid chloride of the following formula

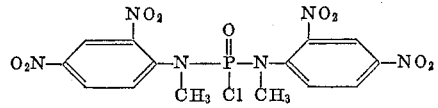

2. The nitroarylamido-phosphoric acid chloride of the following formula

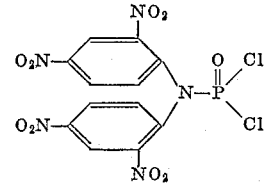

3. A process for the production of nitrophenylamido-phosphoric acid chlorides, characterized by dissolving phenylamido-phosphoric acid chlorides in concentrated nitric acid at a temperature between about —10 and +10° C. and subsequently precipitating from the solution the nitrophenylamido-phosphoric acid chlorides with ice water.

References Cited by the Examiner
UNITED STATES PATENTS
2,658,925  11/53  Cenker et al. _____ 260—580
2,959,582  11/60  Schimmelschmidt et al. __ 260—543

OTHER REFERENCES
Michaelis: Ann., vol. 326 p. 236 (1903).
Kosolapoff: J.A.C.S., vol. 71, p. 1876 (1949).
Kosolapoff: J.A.C.S., vol. 71, pp. 4021–4022 (1949).

LEON ZITVER, *Primary Examiner.*

CHARLES B. PARKER, *Examiner.*